W. O. HALFORD.
AGRICULTURAL IMPLEMENT.
APPLICATION FILED JULY 21, 1915.
1,167,898.
Patented Jan. 11, 1916.
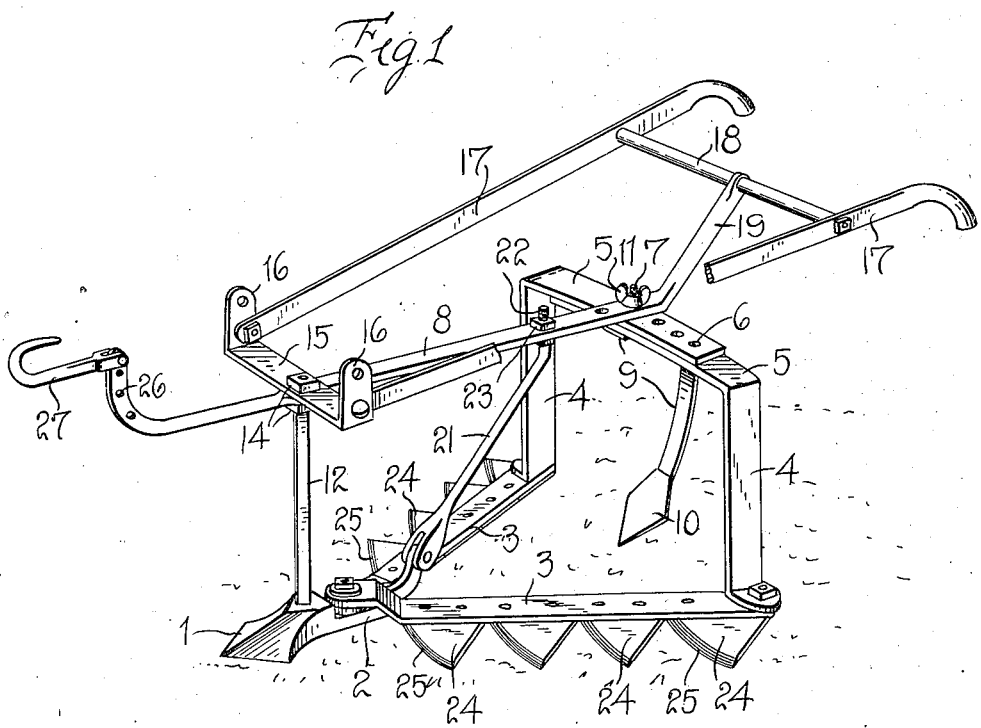
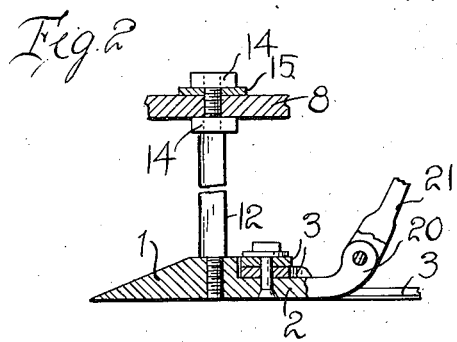
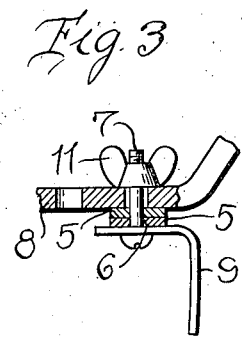
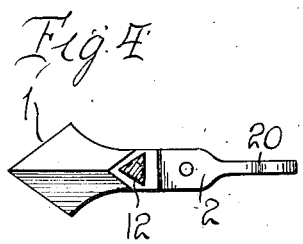
Inventor
W. O. HALFORD
By Watson E. Coleman
Attorney

UNITED STATES PATENT OFFICE.

WILLIAM OLIVER HALFORD, OF McCAMMON, IDAHO, ASSIGNOR OF ONE-FOURTH TO AMOS HAWKS AND ONE-FOURTH TO BRIGHAM Y. GREEN, BOTH OF McCAMMON, IDAHO.

AGRICULTURAL IMPLEMENT.

1,167,898.  Specification of Letters Patent.  Patented Jan. 11, 1916.

Application filed July 21, 1915. Serial No. 41,130.

*To all whom it may concern:*

Be it known that I, WILLIAM O. HALFORD, a citizen of the United States, residing at McCammon, in the county of Bannock and State of Idaho, have invented certain new and useful Improvements in Agricultural Implements, of which the following is a specification, reference being had to the accompanying drawings.
This invention relates to certain improvements in agricultural implements; and it is an object of the invention to provide a device of this general character having novel and improved means whereby it may be employed with convenience and facility as a combined harrow and weeder.

The invention consists in the details of construction and in the combination and arrangement of the several parts of my improved agricultural implement whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view in perspective, with a portion broken away, of an agricultural implement constructed in accordance with an embodiment of my invention; Fig. 2 is a fragmentary view, partly in elevation and partly in section, of the forward extremity of the implement; Fig. 3 is an enlarged fragmentary detail sectional view of the rear extremity of the implement and illustrating certain details of the invention as herein embodied; and Fig. 4 is a view in top plan of the plow point herein embodied, with the coacting upright or post shown in section.
As disclosed in the accompanying drawings, 1 denotes a plow point having its under surface flat and provided with a rear extension 2 with which are pivotally engaged the side members 3, said members being maintained in various relative adjustments through the medium of the upstanding standards 4 provided with the inwardly disposed overlapping extensions 5 provided with the perforations 6 through which the retaining screw 7 is disposed, said screw being also directed through the beam 8. The screw 7 also passes through the stem 9 of the hoe 10 and adjustable upon the screw 7 and coacting with the beam 8 is the winged nut 11 serving in a well known manner to effectively clamp the stem 9 and the extensions 5 in applied position.

Extending upwardly from the point 1 is the post or standard 12 and having its upper extremity suitably engaged with the beam 8, said means being herein disclosed as conventional burs 14 in threaded engagement with the upper extremity of the standard or post 12 and arranged above and below the beam. The upper bur 14 serves to clamp to the beam 8 the transversely disposed member 15 substantially U-shape in form and having operatively engaged with the stems 16, the rearwardly disposed handles 17 tied or connected adjacent their rear extremities by the cross bar 18 which also passes through the free extremity of the upturned angular end portions 19 of the beam 8 whereby it will be perceived that the handles 17 are effectively and conveniently maintained in applied position.

The extension 2 of the point 1 is provided with a rearwardly disposed upturned arm 20 with which is operatively engaged an end portion of the brace rod 21, said rod being disposed rearwardly on a predetermined incline and having its upper end portion 22 disposed through the beam 8 and maintained against displacement through the medium of the conventional burs 23. By this arrangement, it will be perceived that the point 1 is effectively held against rearward displacement. Projecting laterally from the side members 3 are the blades 24 substantially V-shape in form with their apices disposed outwardly and having their forward margins 25 formed into cutting edges, said members 24 serving to effectively sever weeds or the like while the point 1 and the hoe 10 serves as a cultivator.

The forward extremity of the beam 8 is upturned, as at 26, to afford means whereby convenient draft rigging may be suitably engaged therewith and, as herein embodied, said upturned extremities are provided with a clevis 27, although any other means may be employed which may be used with the same facility.

From the foregoing description, it is thought to be obvious that an agricultural implement constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

1. An agricultural implement comprising a plow point, side members pivotally engaged therewith, cutting members extending laterally from said side members, uprights carried by the side members and provided with inwardly disposed overlying extensions, a clamping member coacting with said overlying extensions, and a hoe maintained in applied position by the clamping means of said extensions.

2. An agricultural implement of the character described comprising a plow point, side members operatively engaged therewith and provided with cutting members, uprights carried by said side members and provided with overlying extensions, a post carried by the plow point, and a beam secured to the upper extremity of the post and to the overlying extensions of the uprights.

3. An agricultural implement of the character described comprising a plow point, side members operatively engaged therewith and provided with cutting members, uprights carried by the side members and provided with overlying extensions, a post carried by the plow point, a beam secured to the upper extremity of the post and to the overlying extensions of the uprights, and a brace rod interposed between the point and the beam.

4. An agricultural implement of the character described comprising a plow point, side members operatively engaged therewith and provided with cutting members, uprights carried by said side members and provided with overlying extensions, a post carried by the plow point, a beam secured to the upper extremity of the post and to the overlying extensions of the uprights, a rearwardly disposed extension carried by the point, and a brace rod operatively engaged with said extension and with the beam.

5. An agricultural implement of the character described comprising a plow point, side members operatively engaged therewith and provided with cutting members, uprights carried by said side members and provided with overlying extensions, a post carried by the plow point, a beam secured to the upper extremity of the post and to the overlying extensions of the uprights, a transversely disposed member secured to the beam above the post, handles secured to said member and disposed rearwardly of the implement, a rod connecting the free end portions of said handles, said beam being provided with an extension with which said rod is operatively engaged.

In testimony whereof I hereunto affix my signature in the presence of two witnesses.

WILLIAM OLIVER HALFORD.

Witnesses:
EDWARD MURPHY,
W. G. WATTS.